Figure 1:
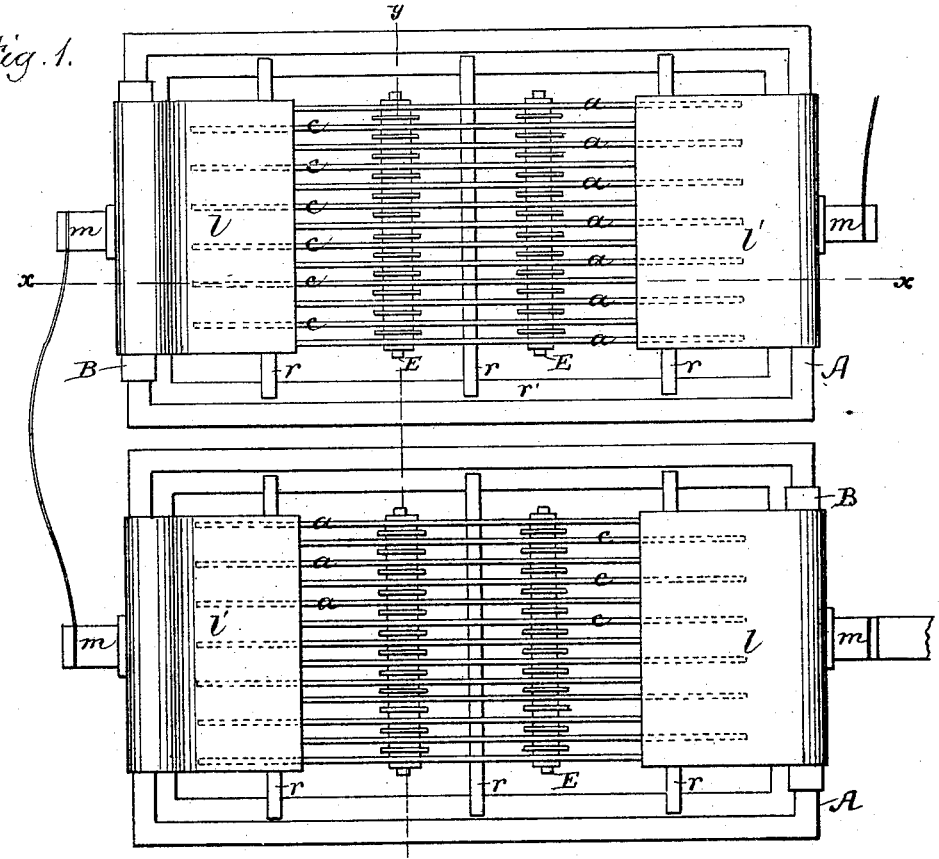

(No Model.)  2 Sheets—Sheet 1.

W. H. REMINGTON.
SECONDARY BATTERY.

No. 342,385. Patented May 25, 1886.

Witnesses.
T. H. Brown
A. J. Powers

Inventor
W. H. Remington
by Wight & Brown
Attys.

(No Model.) 2 Sheets—Sheet 2.
W. H. REMINGTON.
SECONDARY BATTERY.
No. 342,385. Patented May 25, 1886.
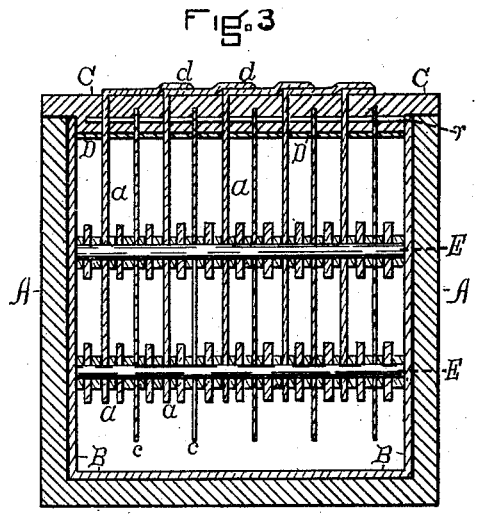
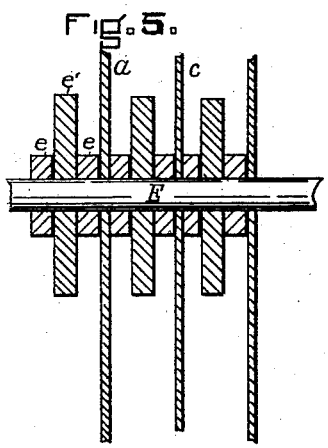
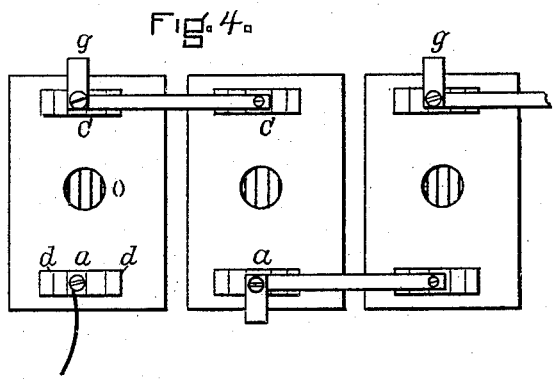
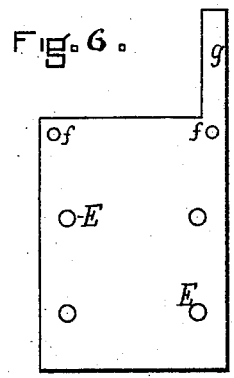
Witnesses.
H. Brown
R. J. Powers
Inventor.
W. H. Remington
by Wright & Brown
Attys.

UNITED STATES PATENT OFFICE.

WILLIAM H. REMINGTON, OF BOSTON, MASSACHUSETTS, ASSIGNOR TO EDWARD F. HAGAR, OF SAME PLACE, AND HENRY SAWYER, OF CHELSEA, MASSACHUSETTS.

SECONDARY BATTERY.

SPECIFICATION forming part of Letters Patent No. 342,385, dated May 25, 1886.

Application filed November 15, 1884. Serial No. 148,008. (No model.)

*To all whom it may concern:*

Be it known that I, WILLIAM H. REMINGTON, of Boston, in the county of Suffolk and State of Massachusetts, have invented certain Improvements in Secondary Batteries, of which the following is a specification.

My invention relates to that class of electric batteries known as "storage" or "secondary" batteries, and has for its object to provide certain improvements in preparing the plates, and certain improvements in the mechanical construction of the battery.

In storage-batteries the plates are generally formed of lead, and by use become covered with a coating of lead dioxide. Said plates are generally immersed while in use in dilute sulphuric acid, which, together with lead dioxide, forms lead sulphate, which is very injurious and causes the destruction of the plates.

My invention consists in the method hereinafter described of preparing or coating the plates before use, whereby they are protected from the injurious action of the acid solution, and in certain improvements in the mechanical construction of the battery.

In preparing my plates I first make a solution of caustic alkali in water, and to this I add as much of any of the oxides of lead as can be dissolved either with or without the aid of heat. I prefer to use litharge, in which case heat must be employed. In said solution, contained in a suitable vessel, I place the lead plate to be prepared. I also place in the solution a porous cell containing acidulated water or any liquid conductor of electricity, in which is immersed a metallic or carbon plate as an electrode, or any suitable conductor of electricity. I then pass an electric current through the apparatus in such direction that the lead plate in the alkaline solution becomes the anode or "plating-off plate." A black or brown coating almost immediately begins to form on the plate, which becomes thicker with the continuation of the current. When this coating is of sufficient thickness, I remove the plate from the solution and rinse both with acidulated and plain water until the alkali is removed. This coating is found to perfectly protect the plates from the action of dilute sulphuric acid either with or without an electric current. The coating acquires a fine granular or velvety surface by the action of the current, the absorptive power of the plates being increased by this surface.

I have used a battery in which both the anode and cathode plates were of lead thus prepared and immersed in a solution of dilute sulphuric acid, and find that after long continued use the plates suffered no loss or injury. If desired, however, the cathode-plates may be of lead plated with copper, nickel, or iron by electro-deposition, or, if desired, said cathode-plates may be of solid copper or nickel or iron.

In preparing the cathode plates thus made I make their surfaces sandy, granular, or spongy by increasing the strength of the electric current while said plates are immersed in a suitable solution, as in electroplating. By this treatment the absorptive power of the cathode-plates is considerably increased. The granular surface thus formed is coarser than that formed on the protective coating of the lead plates.

In forming a storage-battery I secure the plates to a suitable support preferably as described hereinafter, the anode and cathode plates alternating in the usual manner, and place them in a vessel containing a solution of copper sulphate, or nickel sulphate, or iron sulphate, or dilute sulphuric acid, accordingly as the cathode-plates have lead, copper, nickel, or iron surfaces. The plates that have been in the caustic alkali solution, and have thus become coated, I then place in the cell to be formed, calling one plate "A" and one plate "C." If there were a larger number of plates there would be a series of A plates and a series of C plates alternating, there always being, however, one more of the A plates than of the C plates, which latter, as I afterward explain, are connected with the sides and bottom of the cell. I turn the electric current from a straight current dynamo into the A plate or series of A plates, and continue to charge the cell until gas is given off freely, which I believe indicates that the plate has received and taken up all the electrical energy it is capable of receiving and taking up. I then draw out the charge in any convenient way. I then turn a like current into the C plate or series of C plates and continue it until gas is given off freely, as before, when I draw out the charge in any convenient way. This I repeat until the plates are coated so far and so deep as is consistent with still retaining a sheet of metallic lead inside of the coating. The battery is then ready for use, and henceforth the electric current is never to be introduced except into the A plates, which are the anode-plates. When a battery thus formed—say with copper sulphate—is being charged, the hydrogen and copper collect on the cathode-plates, while the oxygen goes to the anodes, increasing the thickness of the layer or coating.

I have used a copper plate as a cathode and dilute sulphuric acid instead of a sulphate with good results. I prefer a lead plate electroplated with copper, nickel, or iron for my cathode, instead of a solid plate of one of these metals.

In the construction of the battery I have made improvements which greatly increases its storage capacity and ease of construction, which are shown in the accompanying drawings, in which—

Figure 2:
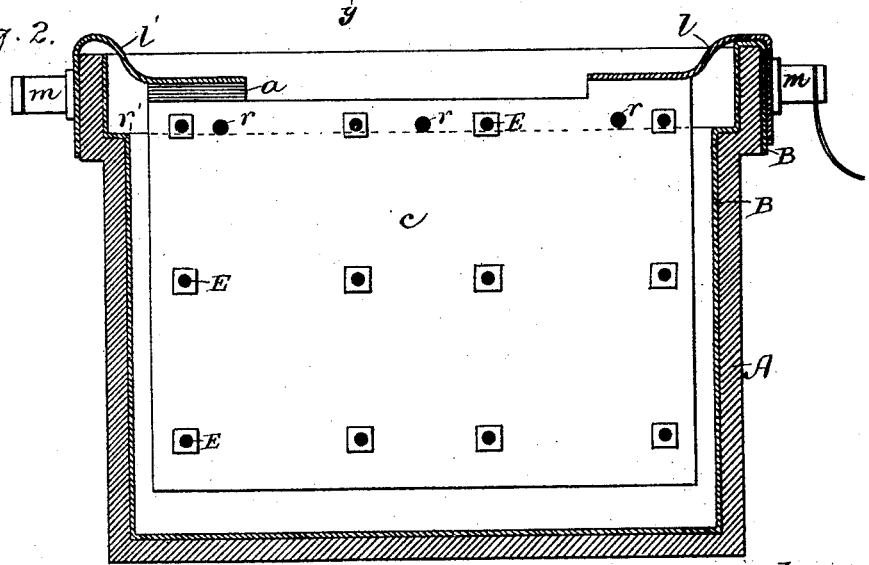

Figure 1 represents a top view of two adjoining boxes, the most approved construction, and means of constructing and coupling together. Fig. 2 represents a section on line X X, Fig. 1. Fig. 3 represents a vertical section on line Y Z, Fig. 4. Fig. 4 is a plan or top view of several boxes, showing a modification of the construction and mode of coupling together. Fig. 5 is a detached section of a part of Fig. 3, enlarged to clearly shown details. Fig. 6 is a detached view of one plate.

In the forms of a storage-battery hitherto constructed it has been customary to use vessels to contain the plates and solution made of some non-conducting material, the object being merely to have a receptacle which should not be acted on by the contained acid fluids. I utilize the interior surfaces of this receptacle, which have hitherto been electrically useless, by a suitable metallic lining, and thereby not only gain an increased active surface directly, but I gain an increased storage capacity through the spongy metallic deposit, which falls to the bottom of the vessel and would become inactive were the latter made in the usual form. Said lining is preferably prepared in the same manner that the cathode-plates are—of lead with a protective coating. The lining must be of the same material, and when the cathode-plates have copper, nickel, or iron surfaces the lining must have the same surface, the lining being connected to the cathodes and forming an additional cathode-plate.

In the drawings, A represents a square box, (of wood, in this case,) and B is the lining, continuous throughout the sides, ends, and bottom of the box. $a$ $a$ are the oxygen or anode-plates; $c$ $c$, the cathode-plates. These plates are mechanically connected by a number of non-conducting rods, E E, which pass through holes in the plates at right angles to the same. Non-conducting washers $e$ $e$ are placed upon the rods between the plates, to keep the latter apart. It will be noticed that there are three washers between each pair of plates on each rod, the middle one being of greater diameter than the other two. By this arrangement I prevent any possible contact between the adjacent plates by the accumulation of spongy metal in the lower portion of the box, while the small washers in contact with the plates diminish as little as possible the effective area. I may make the cathode-plates larger than the anodes, as shown in Fig. 3, for it can do no harm if the deposit of spongy metal which collects on the bottom of the vessel makes contact with the cathodes, as the whole interior of the box, together with the deposit itself, is a part of the cathode surface. In the construction shown in Figs. 1 and 2 no cover is provided, the plates being supported by hard-rubber rods $r$, passed through them and resting at their ends on shoulders $r'$, formed on the inner surface of the box, near its top.

The cathode-plates are secured by burning or welding them to a lead plate, $l$, and the anode-plates are similarly secured to a lead plate, $l'$, no solder being used in making the connection. Said plates are at opposite ends of the box and are bent over said ends and connected to suitable binding-posts, $m$, connection from one box to another being effected by metallic strips or wires secured to said posts. The lining $b$ is carried over the end of each box in contact with the plate $l$, to which the cathode-plates are connected.

In the construction shown in Figs. 3, 4, 5, and 6 the box is provided with a cover, C, to which both the anode and cathode plates are secured, the anode being insulated from the cathode plates, as hereinafter described. A flap of the lining is connected on the cover C with the cathodes, as shown at $g$ $g$, Fig. 4.

In securing the plates to the cover C of the box, I make a number of parallel slits partly through the cover, (see Fig. 3,) into which I insert the edges of the plates, keeping them in place by non-conducting rods $r$, passing through holes in the plates and cover, in the manner shown in Fig. 3. After securing the plates in this manner, I pour on hot asphaltum or other insulating material, forming a moisture-proof coating, D, over the lower surface of the cover, and both insulating and holding the plates. If desired, the cover may be made of hard rubber or glass or other insulating material. Each plate is cut with a long tongue or flap, as shown in Fig. 6, and plates of like sign have flaps brought up through the same end of the cover. The flaps are then bent down, each flap being burned or welded to the next, as shown at $d$, Figs. 3 and 4.

Appropriate binding posts or screws are provided, also openings o o in the cover, to permit inspection of the interior of the box.

Fig. 4 shows the connections for charging.

I prefer the construction shown in Figs. 1 and 2, because by said construction the cover is dispensed with and the screw-cups are located at the outside ends of the box, this arrangement of screw-cups being more convenient than that shown in Figs. 3 and 4.

I do not herein claim the construction of the battery described, as that is required by the office to be embraced in a separate application.

I claim—

The method herein described of preparing the plates of secondary batteries, the same consisting in preparing a saturated solution of lead in caustic alkali, immersing the lead plate therein, and depositing a coating upon said plate by electrolytic action.

In testimony whereof I have signed my name to this specification, in the presence of two subscribing witnesses, this 11th day of November, 1884.

WILLIAM H. REMINGTON.

Witnesses:
C. F. BROWN,
E. AUSTIN PAIGE.